Feb. 19, 1929.

F. N. JORDAN 1,702,830

DRAWBAR COUPLING

Filed March 15, 1927

Frank N. Jordan, Inventor

By Richard B. Owen

Attorney

Witnesses

Patented Feb. 19, 1929.

UNITED STATES PATENT OFFICE.

FRANK N. JORDAN, OF BOSTON, MASSACHUSETTS.

DRAWBAR COUPLING.

Application filed March 15, 1927. Serial No. 175,549.

This invention relates to the class of coupling devices and pertains particularly to an improved type of coupler for use upon trucks, particularly trailers.

The primary object of the present invention is to provide a coupling device of such construction as to permit the quick and easy attachment thereto of a draw bar of another truck and so formed as to prevent accidental disengagement of the bar therefrom.

A still further and final object of the present invention is to provide a coupling device for engagement with a ring forming a part of the draw bar of the truck, in such manner as to prevent breakage in the event of a sudden jamming of the parts as when one truck runs into another forwardly thereof upon the sudden stopping of the leading truck.

As is well known, in railway depots, numerous low trucks are provided for transporting freight and baggage from one point to another and a number of these trucks are often hitched in tandem. It frequently happens that the forward one of the trucks is stopped suddenly thus causing the following trucks to run together resulting in the jamming together of the coupling elements between the trucks and breaking or disconnecting the same. Single trucks often are run against steel piers or walls resulting in the breaking of the coupling members carried thereby. The present invention aims to overcome this difficulty, first by locating the coupling element inwardly of the rear edge of the truck platform to prevent the same from coming into violent contact with fixed objects and by so constructing the coupling member as to give to it the greatest possible strength to resist sudden strains placed thereon. Numerous other objects and advantages of the present invention will become apparent as the description of the same proceeds, and the invention will be best understood from the consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention, as expressed in the appended claims.

Figure 1:
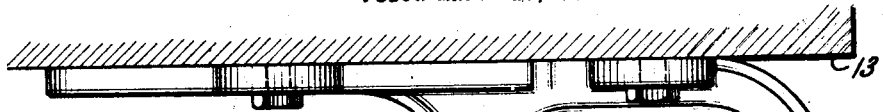
Figure 1 shows the device embodying this invention in side elevation.
Figure 2:
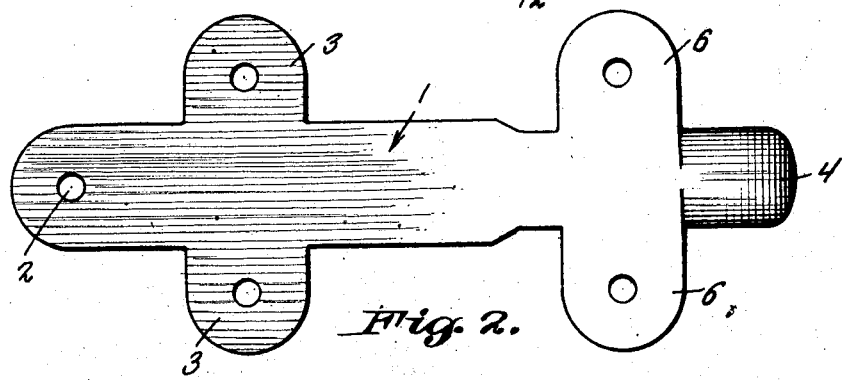
Figure 2 is a plan view of the base of the device.
Figure 4:
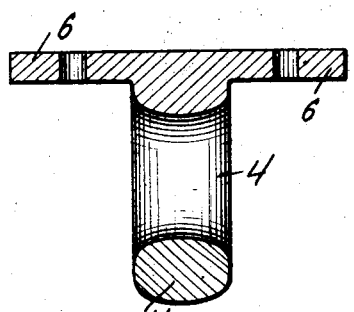
Figure 4 is a transverse section taken upon the line 4—4 of Figure 3.
Figure 3:
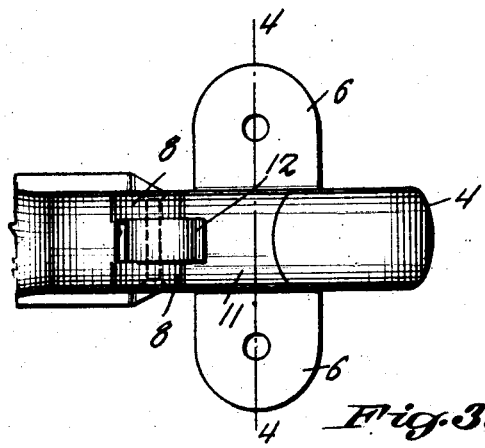
Figure 3 is a view of the under side of the forward end of the coupling member.

Referring now to the drawing in detail, wherein like numerals of reference indicate corresponding parts through the several views, the numeral 1 indicates generally the attaching base of the coupling member which, as is clearly shown, comprises an elongated body flat at the rear portion and merging into a substantially round forward portion. The end of this portion of the base is provided with a bolt aperture 2 and has adjacent thereto laterally projecting apertured ears 3, while the forward portion of the base is curved downwardly and rearwardly setting up the hook bill 4, the free end of which is cut on the bevel as indicated at 5. The forward portion of the base is also provided with laterally projecting apertured ears 6 as shown.

Intermediate its ends the base has formed integral therewith the downwardly projecting and forwardly curving arms 7, the free end of which is in alignment with the free end of the bill 4 and is bifurcated as indicated at 8, each of the furcations being provided with an aperture 9 for the extension therethrough of the pivot pin 10.

Mounted upon the pivot pin 10 is the finger member 11 one end of which extends between the furcations 8 and is traversed by the pin 10 while the other end thereof is beveled to correspond to the bevel of the bill end; the abutting ends of the finger and bill being so cut as to permit the finger to swing inwardly toward the base only.

The rear end of the finger 11 has a depending trigger 12 formed integral therewith, to facilitate the swinging of the finger 11 to open the coupling element to permit the engagement over the bill 4 on a ring (not shown) of the handle of another truck.

As shown in Figure 1, the coupling member is so positioned beneath the bottom or platform of the truck, which platform is indicated by the numeral 13, as to be protected from damage in the event of the collision of the truck with another object.

Having thus described my invention, what I claim is:

A coupling unit of the character described, comprising an elongated base plate having one end thereof reduced and curved downwardly and backwardly in spaced relation to itself, a downwardly and forwardly curving arm formed intermediate the ends of said plate and having the free end opposing and spaced from the free end of the curved end of the plate and further having spaced apertured furcations formed thereon, a closure finger having one end arranged between said furcations and pivotally attached to said arm, the other end of said finger abutting the adjacent curved portion of the plate, said finger and the adjacent end of the plate abutting throughout their end surfaces and having the said surfaces extending obliquely with respect to the length of the finger, and an actuating trigger formed integral with and depending from the pivoted end of said finger.

In testimony whereof I affix my signature.

FRANK N. JORDAN.